United States Patent [19]

Borel

[11] 4,202,115
[45] May 13, 1980

[54] SHOT SIMULATING APPARATUS

[76] Inventor: Jacques M. L. Borel, 10 Square Raynouard, 78150 Rocquencourt, France

[21] Appl. No.: 914,686

[22] Filed: Jun. 12, 1978

[51] Int. Cl.$^2$ ............................................. F41F 27/00
[52] U.S. Cl. ........................................... 35/25; 354/76
[58] Field of Search .......... 35/25; 273/101.1, 102.1 R, 273/102.1 C, 102.2 R, 105.1; 354/76, 79

[56] References Cited

U.S. PATENT DOCUMENTS

| | | | |
|---|---|---|---|
| 1,376,357 | 4/1921 | Place | 273/101.1 X |
| 2,023,497 | 12/1935 | Trammell | 35/25 |
| 2,928,190 | 3/1960 | Evans | 35/25 |
| 2,968,877 | 1/1961 | Becher | 35/25 |
| 3,062,114 | 11/1962 | Palos | 354/76 X |
| 3,545,356 | 12/1970 | Nielsen | 341/79 |
| 3,688,665 | 9/1972 | Herden | 354/79 |
| 3,785,261 | 1/1974 | Ganteaume | 354/76 |
| 3,911,451 | 10/1975 | Vodkenhuber | 354/79 |

FOREIGN PATENT DOCUMENTS

| | | | |
|---|---|---|---|
| 449092 | 6/1948 | Canada | 354/76 |
| 2313655 | 12/1976 | France | 35/25 |

Primary Examiner—William H. Grieb

[57] ABSTRACT

The apparatus comprises in combination with a support having a butt, a trigger and a device defining a line of sight, an image recording apparatus. A device forms the image of a cross-wires and a magnifying optical device whose optical axis is roughly parallel to the line of sight with a very small parallax is combined with the image recording apparatus to form an image therein. A connecting and actuating device actuates the release of the image recording device. The arrangement is such that the picture is taken by the image recording apparatus with a delay which is equivalent, in a real rifle, to the time that elapses between the actuation of the striker and the issue of the projectile from the barrel and it is completed by an interpreting device whereby it is possible to ascertain the precision of the aim and effect the necessary correction.

9 Claims, 12 Drawing Figures

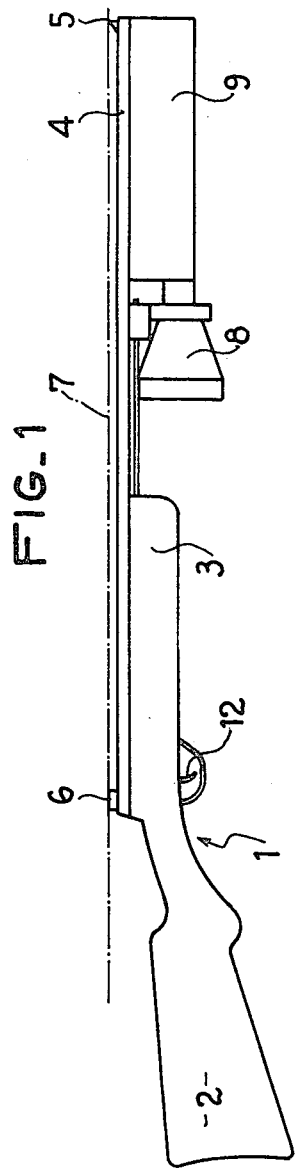
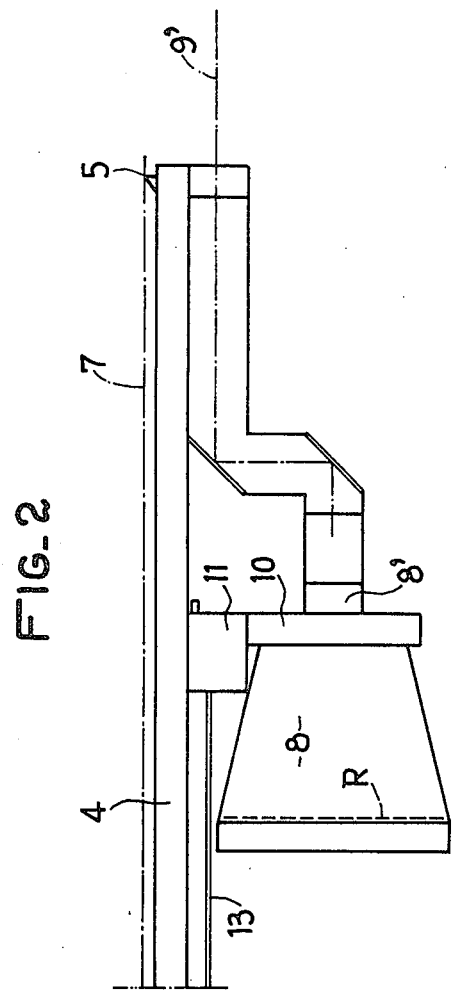

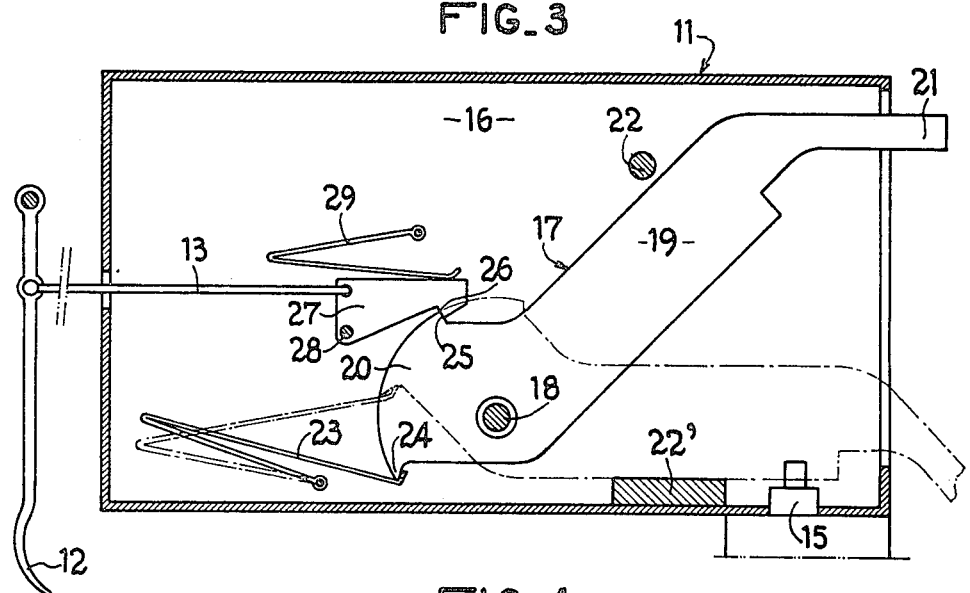
FIG_3
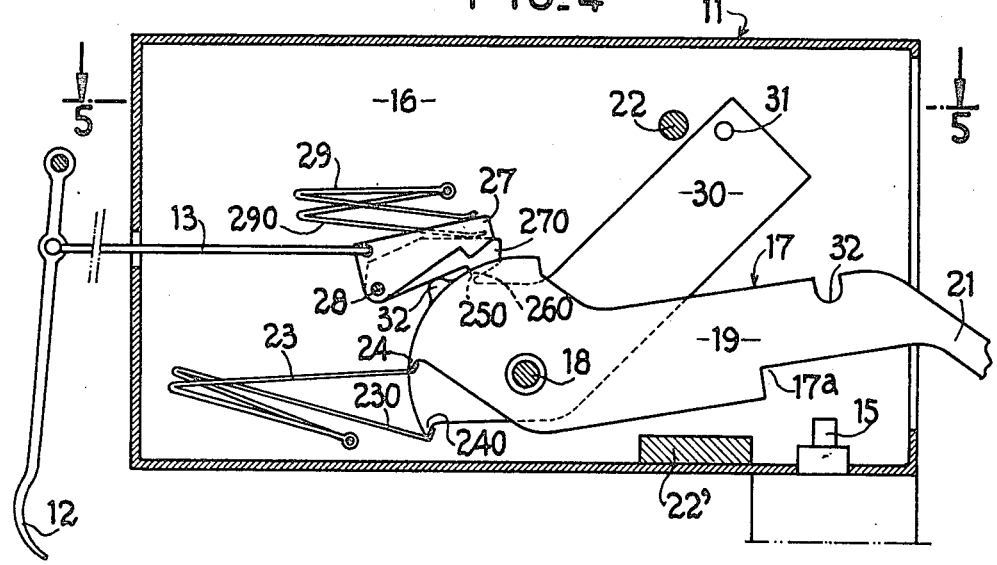
FIG_4
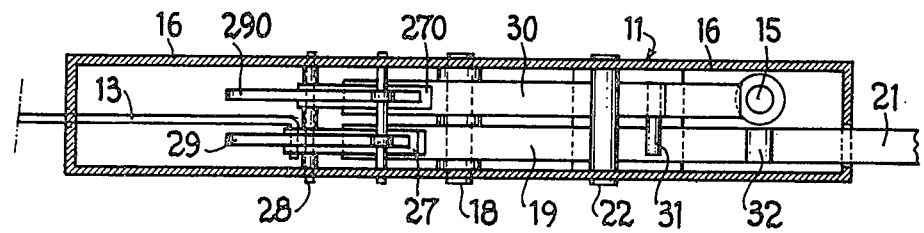
FIG_5

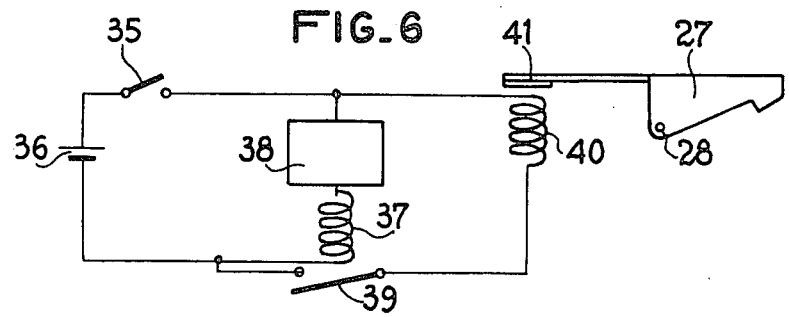
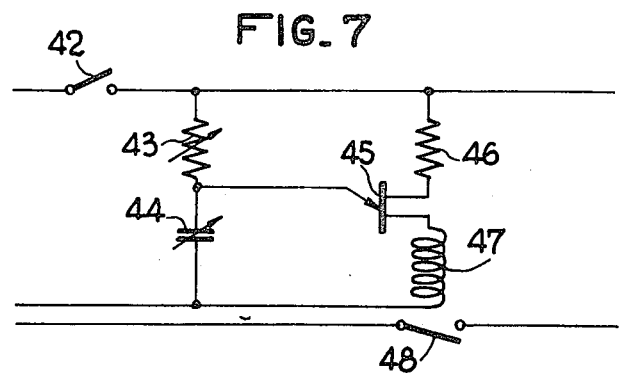
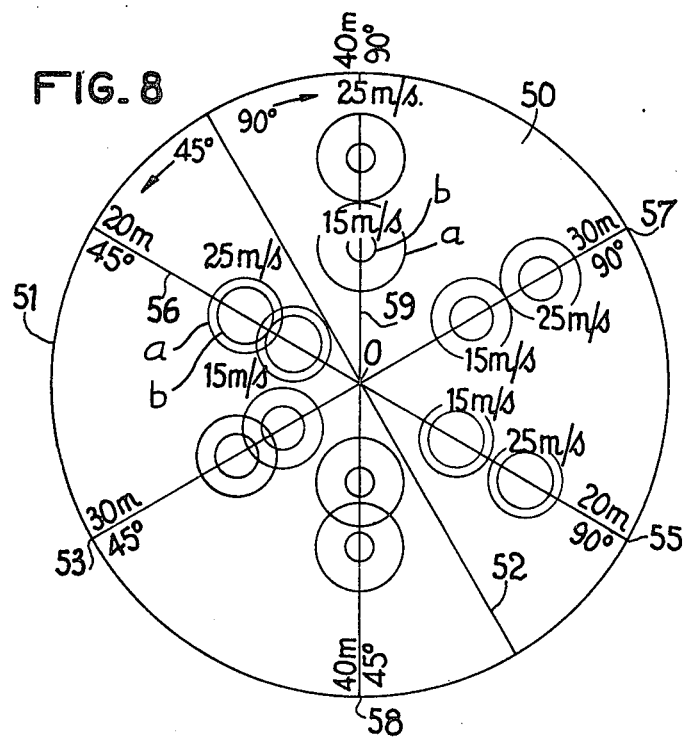

SHOT SIMULATING APPARATUS

The present invention relates to an apparatus for simulating the shot made with a fire-arm and in particular a fire-arm placed against the shoulder.

A device is known for recording by photography the objective or target aimed at by a manual fire-arm. This device is disclosed in French Pat. No. 76 16 828 and comprises an optical device mounted on the telescope sight located on a fire-arm, this optical device deviating a part of the rays of light toward a photographic apparatus of the type which instantaneously develops the prints and is controlled by the trigger of the arm so as to record the image of the target aimed at when the trigger is depressed. An image of a cross-wires of the telescope sight appears on the image obtained. This device enables the user to photograph the image of the target as it appears to him in the eye-piece of the sight when he depressed the trigger.

This device does not take into account a determinant factor which is the time that elapses between the moment of actuating the trigger and the moment at which the charge or projectile leaves the barrel of the arm. Indeed, the ballistic trajectory of this charge is determined only at this moment.

This known device has other drawbacks such as, for example, an imperfect balance due to the very high position of the photographic apparatus above the axis of the arm, and poor prints owing to the small amount of light which reaches the objective of the apparatus.

An object of the invention is to overcome these drawbacks by providing a portable shot simulating apparatus adapted to be employed, for example, either by inexperienced marksmen for the purpose of learning to aim and fire with precision, in particular at a moving target, or by huntsmen or other riflemen for the purpose of improving the rapidity of their reflexes and the precision of their aim by placing the user in the real conditions of the hunt and providing him with a recording of the actual aim, this recording, in combination with a particular device which immediately shows the result of the shot by indicating, as the case may be, the correction of the aim which would have been necessary to attain the target, bearing in mind various factors such as its distance, its velocity and other factors.

According to the invention, there is provided an apparatus for simulating the shot made with a fire-arm of the type comprising an image recording apparatus, such as a camera, providing an immediate development of the prints, or the like, secured to a support having a butt, a trigger and means carrying a line of sight, a magnifying optical device whose optical axis is roughly parallel to the line of sight with a very small parallax, means for forming the image of cross-wires, and connecting and actuating delay means connecting the trigger to the camera, wherein said delay means are adjustable and the delay produced is practically equal to the time which elapses in a real rifle between the moment the striker strikes against the detonator and the moment when the charge issues from the mouth of the barrel.

If the apparatus according to the invention is employed for simulating a shot at a stationary target, the position of the target relative to a reference indicating on the image the point aimed at shows the precision of the aim.

In the case of a shot at a moving target, the aim must be made a certain distance in front of the target, on the trajectory of the latter, in accordance with its displacement during the duration of the path of the charge. This distance or "correction" depends on the distance of the target, its velocity and the velocity of the charge. In order to ensure exactness, the apparatus according to the invention is associated with an interpreting device comprising references which indicate the aiming corrections which correspond, for a certain type of barrel and munition, to different predetermined conditions of velocity, distance and direction of the trajectory of the target.

Further features and advantages of the invention will be apparent from the ensuing description with reference to the accompanying drawings which are given solely by way of example and in which:

FIG. 1 is a diagrammatic view of the apparatus according to the invention;

FIG. 2 is a partial enlarged view of an embodiment of an arrangement of the camera and the magnifying optical device which is mounted on the objective of the latter;

FIG. 3 is a diagrammatic view of an embodiment of a connecting and actuating device adapted to be interposed between the trigger of the rifle and the actuator of the camera;

FIG. 4 is a view similar to FIG. 3 of a second embodiment of a mechanical connecting and actuating device provided with a mechanical delay device;

FIG. 5 is a sectional view taken on line 5—5 of FIG. 4;

FIG. 6 is a diagram of an embodiment of an electromagnetic connecting and actuating device having a delay;

FIG. 7 is a diagram of an embodiment of an adjustable electronic delay device;

FIG. 8 is a view of an embodiment of a device for interpreting the results obtained by means of the apparatus shown in FIGS. 1 and 2;

Figure 9:
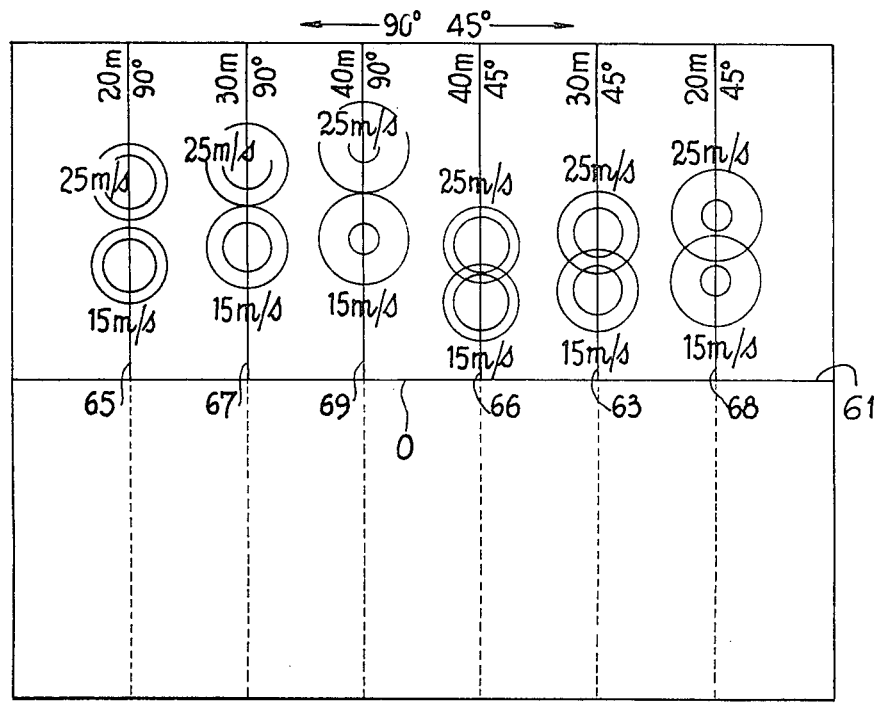
FIG. 9 is a view of a second embodiment of the device shown in FIG. 8.

With reference to FIGS. 1 and 2, the apparatus according to the invention comprises in combination a support constituting for example a dummy rifle generally designated by the reference 1 and comprising a butt 2, a stock 3 and a bar or tube 4 or some other element imitating a rifle barrel provided with a foresight 5 and a backsight 6, the line of sight being shown in dot-dash lines at 7. However, it will be understood that instead of the foresight 5 and backsight 6 there may be employed any other conventional arrangement, for example peephole instead of the backsight or an aiming strip similar to that employed on hunting rifles.

The support 1 comprises an optical assembly which, in the presently described embodiment, is fixed under the barrel of the rifle in the vicinity of the mouth of the latter, but which may also be fixed as desired on the stock 3 by suitable known means.

This optical assembly comprises an image recording apparatus having an objective on which an optical magnifying device is mounted.

In the illustrated embodiment, the image recording apparatus is a camera 8 of known type providing a practically instantaneous development of the photographs and, advantageously, a commercially available camera known under the trademark "Polaroid" which has given excellent results in a prototype apparatus.

This camera comprises an objective 8' which automatically adjusts the exposure time by means of a photoelectric cell and on which there is mounted an optical device which comprises a system of magnifying afocal lenses of known principle, adapted to convert the objective 8' of the apparatus 8 into a telephotographic objective.

Figure 10A:
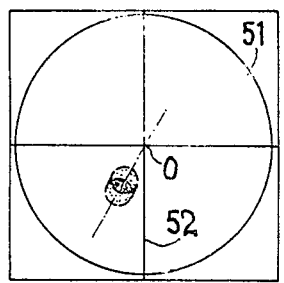
FIGS. 10a, 10b, 10c are diagrams of photographs or prints showing the image of the cross-wires and the target recorded with the apparatus of the invention.

The lenses of this system are calculated to provide suitable magnification and field without requiring focusing and permitting the obtainment of photographs covering, for example, a circular field or area 6 meters in diameter at a distance of, for example, 30 meters on the whole of the area of a print of normal format of 7.5×7.5 (FIG. 10).

The device 9 may be mounted directly on the optical axis of the objective 8'. However, as this optical axis must be roughly parallel to the line of sight 7 of the support, with a parallax which is as small as possible, this axis must be as near as possible to the line of sight 7.

For this purpose and according to the embodiment shown in FIG. 2, there are advantageously provided two parallel mirrors which are disposed at 45° relative to the optical axis so as to reduce to a minimum the distance between the line of sight 7 and the optical axis 9', the latter remaining consequently in alignment with the axis of the objective which is itself aligned with the point of intersection of the wires of the cross-wires R disposed in a suitable position between the objective of the device 9 and the sensitive surface of the image-recording apparatus 8, the shadow or image of which locates the point aimed at on the photograph when the camera 8 is actuated. In the illustrated embodiment, the cross-wires R is located immediately in front of the sensitive surface.

The camera 8 is actuated by the depression on the part of the user of a trigger 12 similar to that of a rifle and connected to the release device 10 of the apparatus 8 by a connecting device 13 and actuating device 11.

It is arranged to provide the camera with release devices which produce with maximum fidelity the conditions of operation of the percussion devices of a real fire-arm.

This is why the actuating device 11 described hereinafter by way of example is designed in accordance with the principle employed for the design of percussion devices for smooth-barrel hunting fire-arms.

This actuating device 11 comprises a case 16 which is advantageously disposed directly on the photographic apparatus 8 above the release 15 which projects inside the case (FIGS. 3 and 4) in the vicinity of one of the ends of the case.

The case 16 contains an arm 17 for actuating the release 15 and pivotally mounted on a pin 18 in a vicinty of one of the ends of the arm (FIG. 2) so as to be pivotable between an armed position shown in full lines and an operative shown in dot-dash lines. The arm 17 has a rectilinear intermediate portion 19 which extends obliquely between two roughly parallel end portions 20 and 21. The end portion 20 located on the opposite side of the pin 18 relative to the portion 19, has a curved end edge the centre of curvature of which is located on the axis of the pin 18, this edge having at each end a nose portion 24, 25 respectively. The nose portion 24 is engageable with a bent hooked-shaped end portion of a V-shaped spring strip 23 which is pivotally mounted at its other end in the case 16. In the armed position of the arm 17, the spring strip 23 is stressed and biases the arm 17 in the clockwise direction. The arm 17 is maintained in this armed position in opposition to the action of the pin 23 by the hooking of the nose portion 25 with a hooked portion 26 on an end of a lever 27, constituting a pull-off, pivotally mounted on a pin 28 in the case 16 and maintained in engagement with the nose portion 25 by another V-shaped spring strip 29 which is pivotally mounted at its opposite end in the case 16.

The pull-off 27 is connected to one end of a connecting rod 13 the other end of which is connected to the trigger 12.

It will be understood that when the trigger 12 is depressed, the rod 13 pulls on the pull-off and pivots the latter in opposition to the action of the spring strip 29 and thereby releases the nose portion 25 from the hooked portion 26 of the pull-off. The arm 17 then pivots in the clockwise direction under the action of the spring strip 23 and the end of the portion 19 thereof opposed to the pin 18 strikes again the release 15 of the camera 8. The end portion 21 of the arm 17 extends out of the case 16, which is open for this purpose, and enables the user to rearm the device 11 by manually shifting this end portion 21 in the counter-clockwise direction until the nose portion 25 once more engages with the hooked portion 26 in opposition to the action of the spring strip 23.

A stop member 22 is provided in the case to limit this movement of the arm 17 and a stop member 23', which is preferably elastically yieldable, is provided in the vicinity of the release 15 to limit the movement of the arm 17 at the end of its travel and absorb the kinetic energy employed and ensure that it is not transmitted to the camera 8.

It has been mentioned hereinbefore that it is necessary to delay the action of the actuating device so as to take into account the interval of time which elapses between the moment the striker strikes against the detonator and the moment the charge issues from the barrel of a real fire-arm.

This delay is obtained for example by means of the actuating device shown in FIGS. 4 and 5.

This device comprises two devices similar to that described with reference to FIG. 3 and mounted in side-by-side relation in the case 16 and adapted to operate in series. The same reference characters have been employed to designate identical component parts in FIGS. 3, 4 and 5.

A release striker 30 is pivotally mounted on the pin 18 in alignment with the release 15 and on one side of the arm 17 which is consequently offset with respect to the release 15 and is unable to encounter the latter owing to the provision of a notch 17a. The striker 30 similar to the arm 17 except that it does not have an end portion extending out of the case 11. It is biased in the same direction as the arm 17 by a spring 230 pivotally mounted in the case on the same pin as the spring strip 23 and has a nose portion 240 which cooperates with the spring 230 in the same way as the nose portion 24 with the spring strip 23. The striker 30 also cooperates with a second pull-off 270, which is identical to the pull-off 27, in the same way as the latter cooperates with the arm 17. The pull-offs 27 and 270 are pivotally mounted on the same pin 28 and a spring 290, identical to the spring strip 29 and pivotally mounted on the same pin as the latter, acts on the pull-off 270.

However, the pull-off 270 is not connected to the rod 13 and the curved edge of the portion 20 of the arm 17 defines a cam 32 which projects therefrom and extends laterally toward the striker 30 and is located vertically below the pull-off 270.

The striker 30 carries a pin 31 at the end thereof opposed to the pin 18 and the arm 17 has a notch 32 at the same distance from the pin 18 as the pin 31.

When the trigger 12 is depressed, the rod 13 and the pull-off 27 release the arm 17 in the manner described with reference to the device shown in FIG. 3, but when the arm 17 turns in the clockwise direction, the cam 32 comes in contact with the pull-off 270 and raises the latter in opposition to the action of the spring 290 and consequently disengages the hooked portion 260 from the nose portion 250. The striker thus released is then driven by the spring 230 and strikes against the release 15.

The stop members 22 and 22' have the same functions as in the foregoing embodiment, but for both elements 19 and 30, and the device is armed in the same way, the striker 30 being raised by the arm 17 through the pin 31 which is received in the notch 32.

Owing to this operation in series, the desired delay is produced and may be rendered adjustable by modifying the dimension and/or the position of the cam 32.

It must be understood that the invention may be adapted to different mechanisms in which the striker is made to undergo a movement in translation, as in the case in most warfare fire-arms. This delay may also be produced by electromechanical devices, and an embodiment of such a device is shown in FIG. 6. This device is adapted to replace the connecting rod 13 and the mechanical delay means comprise a switch 35 which may be actuated by the trigger 12, a generator 36 being connected to the switch 35 and moreover to a relay coil 37 connected to a delay device 38 of any known type which is connected to the switch 35 in a return conductor. When it is excited by the closure of the switch 35 and the delay device 38, the relay 37 closes a switch 39 which actuates an electromagnet 40 whose armature 41 is rigid with an extension rigid with the pull-off 27 of a device such as that represented in FIG. 3.

This electromagnetic delay device also ensures that the photograph is taken at the moment when the charge is assumed to issue from the barrel.

FIG. 7 shows a diagram of an embodiment of an adjustable electronic delay device 38 which comprises, in the known manner, an RC device comprising a variable resistor 43, a variable capacitor 44 controlling a uni-junction transistor 45 whose collector and base are respectively connected to a resistor 46 and a coil 47 of an electromagnet whose armature 48 closes the supply circuit of an electromagnet 40 which is shown in FIG. 6 and shifts the pull-off 27.

With these delay devices, the camera is actuated in such manner as to record an image showing the position of the target at the precise moment when the charge would leave the barrel. However, if the picture obtained by means of the camera described up till now represents the target aimed at, the user can only ascertain the position of the target on the picture with respect to the centre of the cross-wires. This is sufficient for a fixed target, but does not show in a precise manner, in the case of a moving target, if this target would have been struck by the bullet or by the spread formed by the lead shot of a hunting cartridge.

Indeed, as mentioned before, in the case of a moving target, correction must be made in the aim in accordance with the velocity of the target, the angle its trajectory makes with respect to the line of sight and the distance to the target. Account must also be taken of the characteristics of the barrel and of the munition employed which determine the time of the travel of the charge and the dispersion of the latter at certain distances.

In order to take into account the various factors, the apparatus is completed by a device whereby it is possible to interpret the result of the aim of the imagined shot by providing different references adapted to be placed on the recorded image.

This advice, an embodiment of which is shown in FIG. 8, is solely adapted to interpret images recorded by means of the camera and comprises a circular sheet or plate 50 of transparent material adapted to be superimposed on a picture obtained with the camera 8 and on which are engraved a plurality of series of semi-straight lines having as a common point of origin 0 at the centre of the sheet. Each series corresponds to the same given angle between the line of sight and the trajectory of the target and forms radii of a circle 50 having for centre 0, each of these radii corresponding also to a given distance to the target. Thus, for example, the semi-straight lines of the series 56, 53, 58 respectively correspond to distances of 20, 30 and 40 m to a moving target whose trajectory makes an angle of 45° with the line of sight, whereas the semi-straight lines of the series 55, 57, 59 respectively correspond to the same distances to a moving target the trajectory of which makes an angle of 90° with the line of sight.

Each of these semi-straight lines carries the centre of a plurality of pairs of circles, a first or outer circle a and a second or inner circle b, the distances of the centres from the point 0 representing the aim correction required for the distance to which the straight line corresponds and which must be made to the aim in respect of a moving target having a given velocity.

According to the illustrated embodiment, the diameter of each outer circle (e.g. a) corresponds, for a given barrel and ammunition, to scale, to the total diameter of the spread at the considered distance, the inner circle (e.g. b) corresponding to the effective part of this spread, that is to say that containing a sufficient number of lead shot per unit area to kill the game. Moreover, each semi-line carries at least two pairs of circles each corresponding to a different velocity of a target, namely 15 meters/second and 25 meters/second.

In order to interpret the recorded image of the moving target, first of all the trajectory of this target is determined on the picture. If it concerns an animal, its silhouette immediately indicates the direction of its displacement. If it concerns a clay pigeon, under certain aiming conditions, its silhouette is circular and does not enable its trajectory to be reconstituted. In the latter case, it is desirable that its image be recorded in the form of a trail as shown diagrammatically at C in FIG. 10a. For this purpose, the automatic setting device of the camera 8 may be acted upon by artificially reducing the amount of light transmitted to the cell of this device which then reacts and increases the exposure time. In order to avoid an over-exposure of the picture, a filter may be placed on the objective of the camera.

Figure 10B:
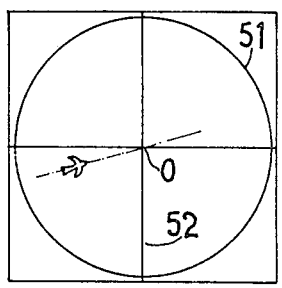

With the trajectory determined in this way, the interpreting disc is superimposed on the picture obtained in such manner as to make the point of origin 0 coincide with the centre of the image of the cross-wires and the disc is rotated so as to bring the suitable straight line parallel to the trajectory of the target. Two cases may be met with:

If the line of sight actually intersects the trajectory, the latter and the straight line are coincident (FIG. 10b).

Figure 10C:
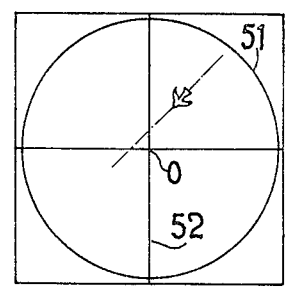

If, on the other hand, the line of sight and the trajectory are not intersecting, the considered straight line and the trajectory are separated by a certain distance (FIG. 10c).

The final step in the interpretation consists in checking whether the target occupies, upon firing, such position relative to the point aimed at, that its trajectory makes it meet the projectile. This condition is effectively fulfilled for a shot with a bullet if the image of the target is coincident with the point of the straight line which corresponds to its estimated velocity. In the case of firing with lead shot, the aim must be considered as being correct if the image of the target is located entirely or partly within the circle representing the dispersion of the charge.

It will be understood that the user determines, in accordance with the position of the image of the target relative to the reference determining the ideal position, the correction he must make in order to achieve a correct aim.

FIG. 9 shows another embodiment of the interpreting device comprising a rectangular plate of transparent material on which are marked a straight line 61 which constitutes the locus of origin of the semi-straight lines corresponding to the trajectories of a target at distances of 20, 30 and 40 meters mentioned hereinbefore at angles of 45° to 90° with respect to the line of sight. These straight lines are designated by the same reference characters as in FIG. 8 increased by 10. It will be understood that instead of turning the plate by centering it on the centre of the cross-wires, it first must be displaced in translation along the straight line 61, so as to bring the origin of a given semi-straight line to the centre of the image of the cross-wires and then oriented so as to place this desired semi-straight line parallel to the trajectory of the target.

It will be understood that the apparatus according to the invention permits any person who desires to learn to shoot or improve his shooting, in particular when hunting and shooting at a moving target, to know almost immediately the errors in the aiming at a target and to correct them in taking into account the indications provided by the use of the device interpreting the pictures.

It will be understood that there may be provided a certain number of interpreting devices the indications of which are different and established in accordance with characteristics pertaining to different types of fire-arms and ammunition, since the dispersion of the spread is a function of the geometry of the barrels, the quality of the powder, the size and number of the lead shot, the type of plug, etc. Knowing these characteristics, it is easy to establish devices the indications of which correspond to different types of ammunitions and fire-arms.

In an embodiment not shown in the drawings, the apparatus may be constructed in the form of an assembly or unit adapted to be mounted on a real rifle, for example by using an electronic or electromagnetic connecting and releasing device such as described hereinbefore connected to the trigger of the rifle, the device being secured for example by means of clamping collars around the barrel and/or the stock of the rifle and an electric switch being adapted on the trigger. It is also possible to employ the kick-back of the fire-arm to actuate the image recording apparatus, for example, through an inertia-actuated device.

Having now described my invention what I claim as new and desire to secure by Letters Patent is:

1. A portable apparatus for simulating a shot with a fire-arm, in particular a shot with a rifle, comprising a support having a butt, an image recording apparatus, such as a camera providing an immediate development of the prints or the like, secured to the support having a butt, a trigger, means defining a line of sight, a magnifying optical device having an optical axis which is substantially parallel to the line of sight with a very small parallax, means for forming an image of cross-wires on the recorded image, actuating and connecting delay means connecting the trigger to the recording apparatus, said delay means being adjustable and the delay produced being substantially equal to the time which elapses in a real fire-arm between the moment the striker strikes against the detonator of the charge and the moment when the charge issues from the mouth of the barrel of the fire-arm.

2. An apparatus as claimed in claim 1, wherein, in the case of a shot at a moving target, the apparatus is completed by an interpreting device comprising references indicating the aim corrections which correspond, on one hand, to the characteristics of the barrel and the ammunition that the user is assumed to be using and, on the other hand, to various conditions relating to the target, such as the velocity, the distance and the direction of the trajectory.

3. An apparatus as claimed in claim 2, wherein the interpreting device comprises a transparent element adapted to be superimposed on the image from the recording apparatus and centered on said image, said references being formed by a series of semi-straight lines having a common locus of origin, each semi-straight line corresponding, for a given type of barrel and ammunition of the fire-arm, to a given distance to the target and to a given angle of the trajectory of the target relative to the line of sight, each of said semi-straight lines carrying at least one reference whose distance from the locus of origin indicates the aim correction required as a function of data corresponding to said semi-straight line for a given velocity of the moving target.

4. An apparatus as claimed in claim 3, wherein each reference comprises a first circle whose diameter indicates, to scale, the total diameter of a spread of lead shot at said given distance, and a second circle inside the first-mentioned circle whose diameter indicates the region of maximum effectiveness of said spread.

5. An apparatus as claimed in claim 1, wherein the image recording apparatus comprises a release member for the actuation thereof and the connecting and actuating device comprises a case, a mechanism comprising an element mounted within the case to be movable between an armed position and an operative position of contact with said release member, a pull-off connecting means connecting the trigger to the pull-off, the pull-off being associated with said element in said armed position for releasably retaining said element in said armed position, and a spring for biasing said element when it is located in said armed position.

6. An apparatus as claimed in claim 5, comprising a second element and a second pull-off for releasably retaining the second element which are mounted in the case, means associating the second pull-off and the second element with the first-mentioned element and the first-mentioned pull-off to ensure that the movement of the first-mentioned element released by the first-mentioned pull-off releases said second element from its engagement with said second pull-off, said second element being associated with means to actuate the release member of the image recording apparatus, the actuation in series of the second element by the first-mentioned element producing a delay between the depression of the trigger and the actuation of the image recording apparatus.

7. An apparatus as claimed in 5 or 6, wherein said connecting means comprise a rod.

8. An apparatus as claimed in claim 5 or 6, wherein said connecting means comprise an electric circuit connected to be controlled by the trigger and including an electromagnet which is operative to act on the first-mentioned pull-off, and a delay device.

9. An apparatus as claimed in claim 1, wherein the image recording apparatus, the cross-wires, the magnifying optical device and the connecting and actuating device are arranged in such manner as to constitute a unit which may be mounted on a rifle.

* * * * *